Nov. 1, 1949  H. F. LUNDBERG  2,486,956
OPTICAL COMPARISON HEMOGLOBINOMETER WITH SWITCH FOR
USE OF SELF-CONTAINED OR EXTERNAL POWER SOURCES
Filed Nov. 24, 1945  2 Sheets-Sheet 1
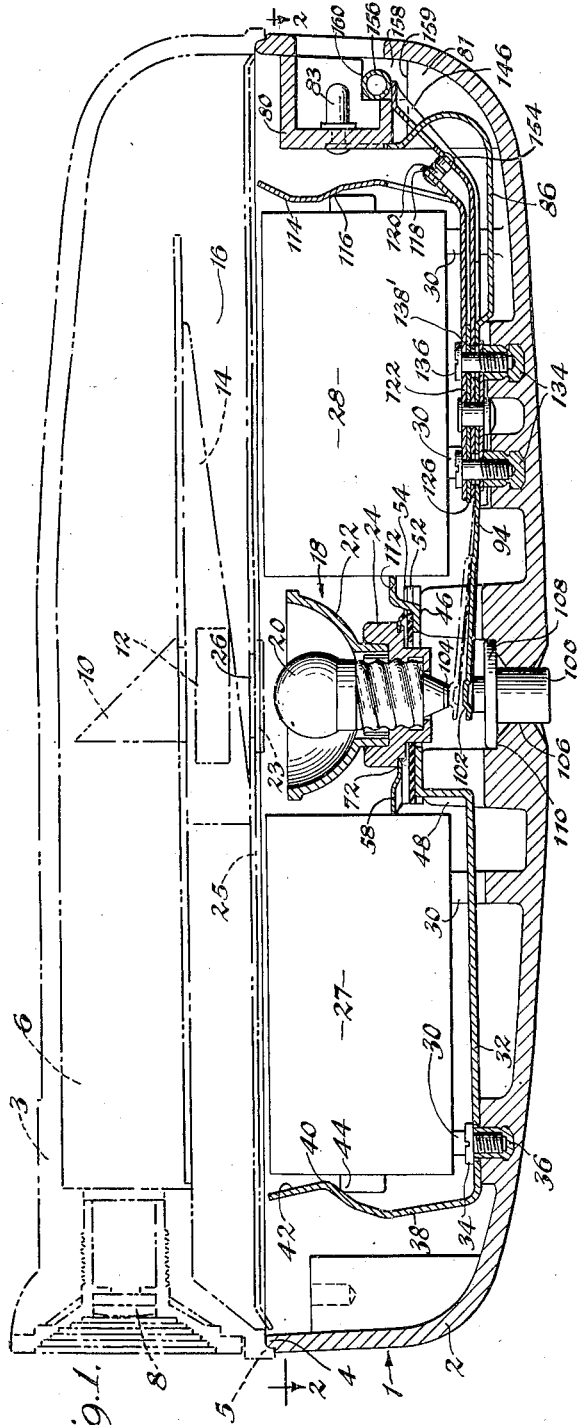
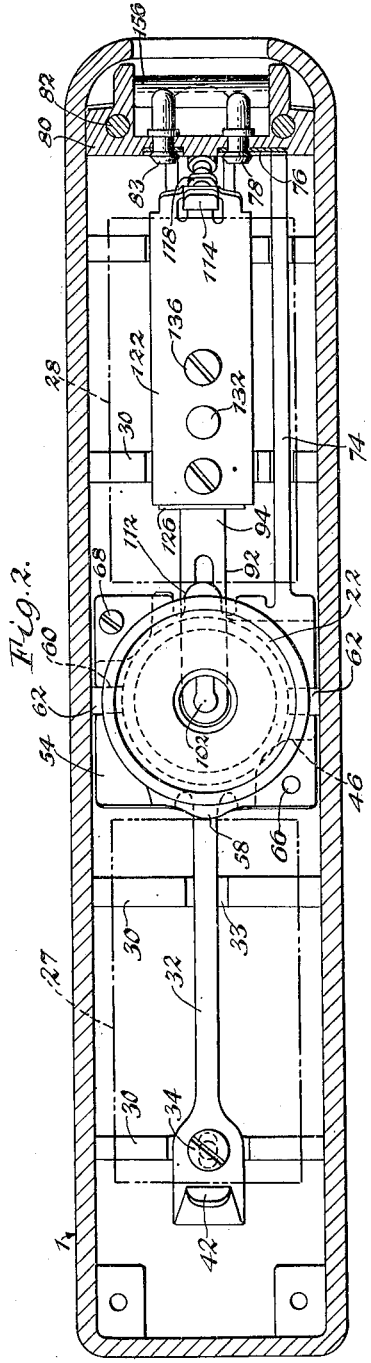
INVENTOR.
HARRY F. LUNDBERG
BY
Noble S. Williams
ATTORNEY Nov. 1, 1949 H. F. LUNDBERG 2,486,956
OPTICAL COMPARISON HEMOGLOBINOMETER WITH SWITCH FOR
USE OF SELF-CONTAINED OR EXTERNAL POWER SOURCES
Filed Nov. 24, 1945 2 Sheets-Sheet 2
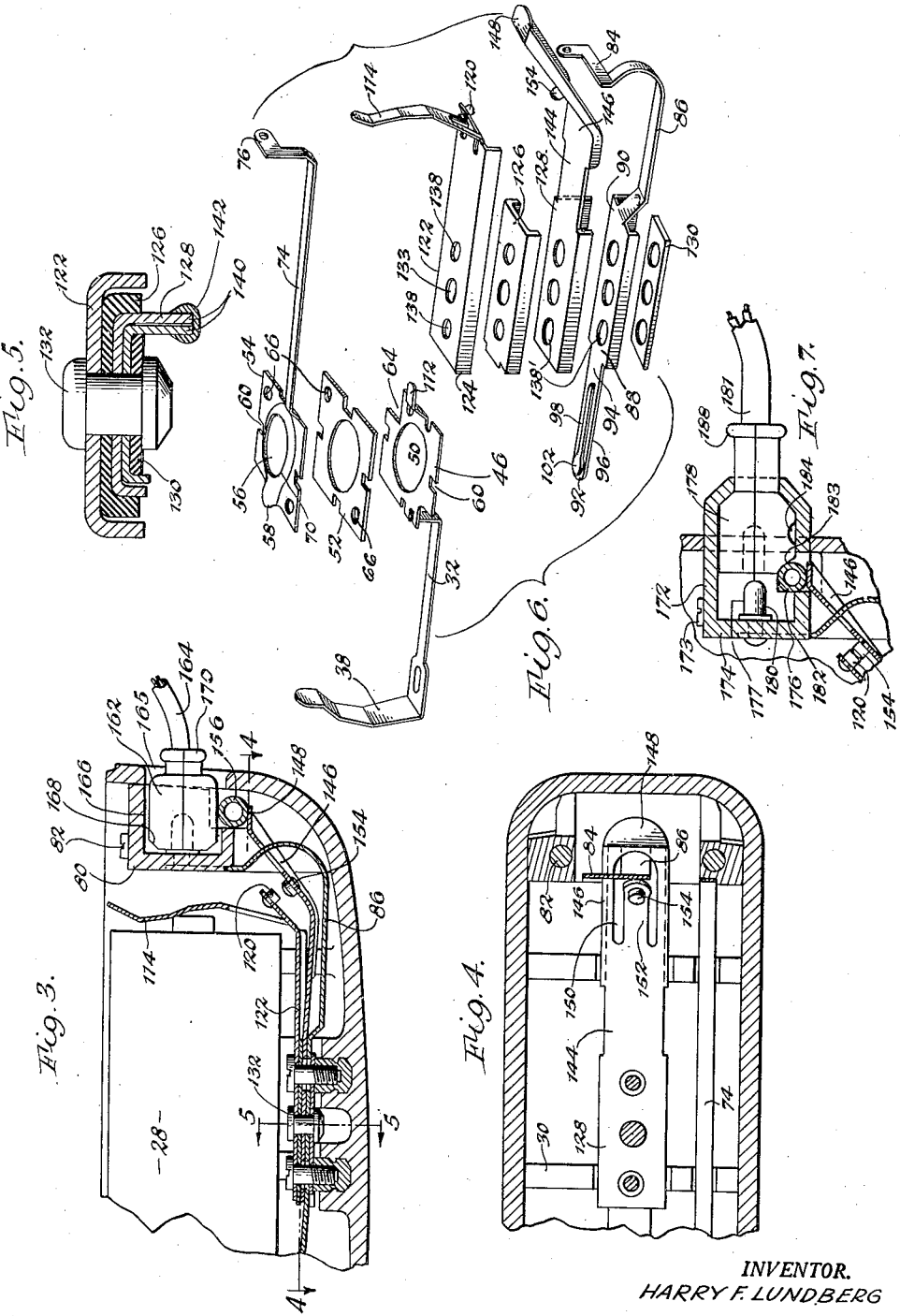
INVENTOR.
HARRY F. LUNDBERG
BY
ATTORNEY Patented Nov. 1, 1949

2,486,956

UNITED STATES PATENT OFFICE 2,486,956

OPTICAL COMPARISON HEMOGLOBINOMETER WITH SWITCH FOR USE OF SELF-CONTAINED OR EXTERNAL POWER SOURCES

Harry F. Lundberg, Buffalo, N. Y., assignor to American Optical Company, Southbridge, Mass., a voluntary association of Massachusetts Application November 24, 1945, Serial No. 630,610

6 Claims. (Cl. 88—14)

This invention relates to hemoglobinometers, and more particularly to such an instrument which is compact and convenient for use by a physician in his office and which is also readily portable so that it may be easily carried by the physician in his medicine kit and used anywhere by him for rapidly and accurately examining the hemoglobin content of a patient's blood. This application is an improvement over copending application Serial No. 440,476, filed April 25, 1942 and issued March 12, 1946 as Patent No. 2,396,260.

In the hemoglobinometer shown and described in said earlier filed application an electric bulb is employed for illuminating the blood specimen and a standard comparison member to be observed through a sighting arrangement housed within a casing, and a pair of batteries of the conventional dry cell type is enclosed therewith and serves as the sole means for supplying energy to the bulb. A difficulty resulting from such a construction resides in the fact that repeated use of the device exhausts the batteries and this, consequently, necessitates frequent replacement thereof by new cells. Furthermore, poor or insufficient illumination of the blood specimen and comparison member when the cells are weak might impair the accuracy of operation of the instrument. Since such an instrument is generally used by a physician at locations where a conventional external source of electric current or energy is available, it has been found desirable to construct and arrange the instrument of the present invention with suitable means for selectively employing such external current or batteries at places where outside current is not conveniently available.

Accordingly, an object of the invention is to provide such an instrument having means whereby electrical energy from an external source may be employed when convenient and means whereby a battery or batteries may be employed when external source is not readily available. Such an arrangement materially extends the life of the batteries of the device, adding greatly to the convenience and efficiency of the instrument.

An additional object of the invention is to provide a new and improved hemoglobinometer which is compact and easy to handle and adapted for use selectively with self-contained dry cells or an outside source of electrical energy.

Another object of the invention is to provide a device which will function automatically upon its batteries when used alone, and which will automatically render the batteries inoperative for supplying energy when the device is "plugged in" for use with an external source of current.

Another object of the invention is to provide a device of the type set forth which is strong, durable, efficient and accurate in its operation and at the same time is of a size, shape and weight which will allow the instrument to be conveniently handled and transported with ease.

Other objects and advantages of the invention will become apparent from the following description taken in connection with the accompanying drawings. It will be apparent that many changes may be made in the details of construction and arrangement of the parts without departing from the spirit of the invention as expressed by the accompanying claims. I do not therefore wish to be limited to the exact details of construction and arrangement of parts shown and described as the preferred form has been shown by way of illustration only.

Referring to the drawings:

Fig. 1 is a side elevational view of the instrument of the invention, the lower part thereof being shown in section by full lines while the upper part thereof is shown only in diagrammatical outline;

Fig. 2 is a transverse sectional view taken substantially on line 2—2 of Fig. 1 and looking in the direction of the arrows;

Fig. 3 is a fragmentary side elevational view showing certain parts in section and in one position of operation;

Fig. 4 is a fragmentary sectional view taken substantially on line 4—4 of Fig. 3 and looking in the direction of the arrows;

Fig. 5 is a fragmentary sectional view taken on line 5—5 of Fig. 3;

Fig. 6 is an isometric exploded view of the electrical conductors employed in the invention; and Fig. 7 is a fragmentary sectional view of a modification of the invention.

Referring more particularly to the drawings wherein similar reference characters designate corresponding parts throughout the several views, the device or instrument shown in Figs. 1-6 comprises a housing or casing generally indicated by the numeral 1 and formed of two separable sections 2 and 3 having interfitting abutting edges 4 and 5, respectively, which may be detachably secured together by screws, resilient clips or the like (not shown).

The sections 2 and 3 of the casing are preferably made of molded plastic or similar material but may be formed from any other desired material. The upper casing section 3 is provided with a sighting chamber 6 extending longitudinally of the casing section and has formed in an end wall of the section an eye piece 8. Intermediate the ends of the section 3 is located a bi-prism 10 for reflecting images of the blood on a specimen holder or carrier 12 and of a standard comparison member or wedge 14 to the eye piece 8. The standard member 14 is longitudinally adjustable in the compartment or guideway 16 for placing various portions of the member adjacent the carrier 12. Since the details of construction and operation of these parts of the device are clearly set forth in said earlier filed application and form no part of the present invention, they will not be discussed in detail herein.

The lower section 2 is provided with illuminating means 18 comprising an electric bulb 20 threaded into a socket 24, of electrically conductive material, and a semi-spheroidal reflector 22 frictionally engaging said socket. The bulb 20 is centrally located substantially midway of the length of the section 2 and in optical alignment with the specimen carrier 12, an adjacent portion of the standard member 14 and the reflecting bi-prism 10 for illuminating the blood specimen and a portion of the member 14 positioned adjacent thereto as clearly shown by Fig. 1. A partition 25 is secured to the section 3 to enclose the operating parts within the section. A diffusing plate 23 is centrally carried by partition 25 overlies an aperture 26 in the partition so as to allow light from the illuminating means to reach the carrier 12 and member 14.

Positioned at opposite sides of the illuminating means 18 and longitudinally within the section 2 are electric batteries 27 and 28, preferably of a standard small dry cell type, and these are arranged to rest upon inwardly projecting integral lugs or ribs 30 formed upon the inner rounded wall of the casing 2 adjacent the opposite ends of each battery. An electrical conductor 32 is arranged centrally of the lower section 2 of the casing and extends through slots 33 formed in the ribs 30. Conductor 32 is adjustably secured in place by suitable means such as a screw 34 threaded into a metallic bushing 36 embedded in a portion of the molded plastic section 2. An outer free arm portion 38 of the conductor 32 is bent upwardly and inwardly to form a shoulder 40 and then bent slightly outwardly to provide a cam portion 42 for resiliently receiving and securely retaining the battery 27 in place in section 2 and for providing a firm electrical contact with an edge portion of a battery terminal as indicated at 44. The opposite end of the conductor 32 is bent upwardly and then horizontally to provide a supporting plate portion 46 which rests upon the integral lugs 48 arranged at opposite sides of the section 2. This supporting plate portion 46 is enlarged, as shown by Figs. 2 and 6, to accommodate a central aperture 50 for receiving the base portion of the socket 24 in spaced relation thereto. Upon the portion 46 is carried an insulating member 52 provided with an aperture for accommodating said socket and positioned thereon is a conductor 54 having an aperture 56 for receiving said socket. An arm 58 extends laterally therefrom for engaging the opposite end wall of the battery 27.

The enlarged plate portion 46, insulating member 52 and conductor 54 are substantially of the same size and shape when viewed from above, and each is provided with recesses 60 located centrally in the side edge portions thereof to serve as centering means arranged to straddle integral lugs or ribs 62 projecting inwardly from the inner wall of the section 2. It will be noted that opposite corner portions of the portion 46 have been removed or omitted to form bays 64 and corresponding opposite corner areas of the insulating member 52 and the conductor 54 have been provided with apertures as indicated at 66 for receiving securing screws 68 threaded into position in the supporting lugs 48 of the molded section 2 to retain the parts 46, 52 and 54 securely in place upon the lugs 48. The bays 64 serve to space the plate portion 46 from the screws 68 and thus the portion 46 is electrically insulated from the conductor 54. The socket member 24 is secured to the conductor 54 and, as will be seen by Fig. 1, is maintained thereby in spaced relation to the member 46, an inner upwardly bent ring portion 70 of the conductor being crimped, soldered, brazed or otherwise secured to the socket as shown at 72.

The conductor 54 is provided with a second arm 74 extending longitudinally from the opposite edge of the conductor from the first mentioned arm 58 and this arm 74 is bent upwardly near its outer end and formed with a portion 76 apertured to receive a terminal member 78 embedded in or otherwise secured to a molded terminal box or junction means 80, which box or block is retained in place upon integral abutments 81 at the end of the section 2 by screws 82 extending downwardly through the block and threaded into said abutments. A second terminal member 83 is provided in block 80 in engagement with an end portion 84 of a resilient arm 86 of conductor 88 and this conductor is provided with an enlarged stiffened or flanged central portion 90 which is apertured and forms a securing and supporting means therefor. The conductor 88 is also provided with an elongated arm 92 having a flexible portion 94 adjacent the central portion 90 and outwardly thereof is a portion 96 stiffened by a central rib 98 to provide sufficient resiliency to respond to the manual actuation of a push button 100 positioned in the bottom central wall of the casing section 2. This resiliency firmly returns the button to its normal position when the pressure thereon is removed. A contact area 102 is formed in the free end of arm 92 and arranged to engage the center contact 104 of the bulb 20 when the push button is pressed. The push button 100 is guided by the walls of an aperture 106 and is prevented from moving outwardly beyond normal position by a skirt portion 108 engaging a recessed portion 110 of the section 2.

The plate portion 46 of the conductor 32, previously referred to, is provided with an upwardly and longitudinally bent finger 112 to contact an end wall of the battery 28. The center contact of the battery 28 at the opposite end thereof engages an upstanding arm 114 as indicated at 116, said arm having the general shape of the arm 38 when viewed from the side, but is somewhat wider in its transverse direction to provide a central struck out arm 118 carrying a contact point 120, said arm extending as a substantially rigid member from the horizontal base portion of a conductor 122. This conductor 122 is provided with downwardly bent lateral flanges 124 to give rigidity to the entire base portion of the conductor and to support the arm 118 in a proper position notwithstanding the flexing of arm 114 carried thereby.

The conductor 122 is arranged to fit over a flanged insulating member 126 which member in turn straddles a flanged conductor 128 straddling conductor 88, previously referred to; a second insulating member 130 being positioned below the member 88. As will be seen by Fig. 5, these five members are securely held in a nested relation by a rivet 132 of non-conductive material positioned in aligned openings 133 so that said members in an assembled condition may be inserted into section 2 and secured to bushings 134 embedded in said casing section by screws 136 extending downwardly through spaced aligned apertures 138 in said nested members. As best shown by Figs. 1 and 6 the spaced apertures in the plates 88 and 128 are somewhat larger than those of the other nested members as indicated at 138' so that the members 88 and 128 will be spaced from and thus insulated from bushings 134 and screws 136 and thus from the conductor 122. In order to insure a good permanent electrical connection between conductors 88 and 128 lateral flanged portions 140 thereof may be extended downwardly beyond the adjacent edges of the other nested members (see Fig. 5) and soldered, brazed or otherwise suitably connected as indicated at 142.

The conductor 128 has a resilient arm 144 extending from an end thereof on which is carried a relatively rigid flanged portion 146 that is bent upwardly at an angle and provided at the upper end thereof is a horizontal bearing surface 148 adapted to be engaged by an operating member to be presently described. The central portion of this upwardly extending arm 146 is apertured as at 150, see Fig. 4, to form a resilient finger 152 extending upwardly and carrying contact point 154 adapted to make, at certain times, an electrical connection with contact point 120 on arm 118. The aperture 150 is made of sufficient size to accommodate in spaced relation thereto the conductor 86 extending therethrough.

The flanged portion 146, as stated, is resiliently supported by the arm 144 so that it may be pressed downwardly by an operating member 156 which, in the present instance, is formed as an elongated tubular member extending transversely of the terminal block 80 and having its opposite ends retained in recesses 158 formed by portions of the casing 2 and adjacent portions of the block 80 as indicated by numerals 159 and 160. From the foregoing description it will be seen that the operating member 156 may be moved from the position shown in Fig. 1, wherein this member is in a raised position and the contact points 120 and 154 are in contact, to its depressed position shown by Fig. 3 at which time the said contact points are spaced from each other. An electrical attachment or socket 162 having a conventional flexible cord 164 for attachment to an external source of electrical energy is provided, as shown by Fig. 3, for insertion through the opening 165 in the casing section 2 into the recess 166 in the terminal block 80 for effecting resilient frictional electrical connections with the terminal members 78 and 83. Opposite corner portions of this two-part separable socket 162 are bevelled or formed as cam surfaces, as indicated at 168, to facilitate the insertion of said socket into the recess 166, and at such time, one of these cam surfaces will engage and depress tubular member 156, thus depressing the arm 146 to interrupt the flow of current through the contacts 120, 154 and this interruption will take place before a circuit is established between the conductors in the socket and the terminals 78 and 83.

When the physician desires to employ the device of the invention at locations removed from a convenient source of external power or energy, it is merely necessary for him to depress the push button 100 to establish a circuit through the proper conductors to light the bulb 20 by energy received from the batteries 27 and 28. The circuit established at such time may be traced from the push button actuated arm 96 through the conductors 88 and 128 to the contact point 154 in engagement with contact point 120, then through arms 118 and 114 to the center terminal of the battery 28, and then from the battery 28 through arm 112, plate member 46, conductor 32 and arm 38 to the center terminal of battery 27. The opposite end of battery 27 is connected by arm 58 to the light socket 24 which is in engagement with the threaded portion of the bulb 20, while the center terminal 104 thereof is in contact with arm 96 thus completing the circuit. However, when it is convenient for the physician to employ an external source of energy, and thereby save the batteries of the instrument, the socket member 162 will be pressed into the terminal block 80 and into engagement with the terminal members 78 and 83. As the socket is pressed inwardly the member 156 is depressed and the contact points 120 and 154 are opened, so that if the instrument is now employed, pressing of the push button 100 will establish a circuit which may be traced from the terminal member 78 through conductor 74, plate 54 and socket 24 to the bulb. When the push button 100 is pressed and the central contact 104 of the bulb is in engagement with the arm 96 current will pass through arm 96, conductor 88 and arm 86 to the terminal member 83.

While the preferred construction shown by Figs. 1, 2, 3 and 4 is provided with the socket member 162 which may be easily removed from engagement with the device by gripping the outer portion 170 thereon, it will be seen in Fig. 7 that the structure may be modified slightly to arrange the device to function with a flexible electrical conductor which is not removable from the device but at all times attached thereto. In Fig. 7 the modified structure comprises a terminal means or junction box 172 which may be inserted into the end wall of the casing section 2 and secured by suitable means such as a pair of laterally spaced screws 173 extending vertically through the block and into lugs in the section 2. This box may be formed by two molded sections 174 and 176 divided longitudinally thereof as at 177 so that a movable molded two-part socket member 178 attached to a flexible electric cord 181 may be positioned within the box and arranged to move from an inoperative outer position shown by Fig. 7, at which time the external source of energy is disconnected from terminals 180, to a left hand or inner position in engagement with the terminals. These terminals correspond to previously described terminal members 78, 83 of Fig. 1 and the movement of said socket member 178 to the left hand position is such that a rod or tubular member 182 in engagement with a cam surface 183 will be depressed and the arm 146 moved downwardly to open the contact points 120 and 154 in the manner previously described. A recess 184 of smaller height than the cam surface 183 is provided in the socket for the rod 182 so that the socket 178 will be yieldably retained in its inner position while the external source of energy is being used. Likewise the cam surface 183 tends to urge the socket 178 toward its outer position after the finger or rim portion 188 thereof has been grasped to move the socket member toward said position. Obviously, in this modified construction the flexible cord 181 and a conventional plug carried thereon may be folded into a compact form or wrapped around the instrument so as to occupy but little space when the device is not in use.

Thus it will be seen that the device of this invention is constructed and arranged to provide a convenient and compact portable instrument for easily measuring the hemoglobin content of the blood, which device facilitates the examination of blood by the physician whether near a source of external current or at locations removed therefrom.

From the foregoing description it will be seen that a simple, compact, efficient and economical means has been provided for obtaining all of the objects of the invention as set forth above.

Having described the invention, I claim:

1. In a portable device of the character described having an elongated casing of such limited size and transverse sectional shape that diametrically opposed exterior surfaces thereof may be conveniently gripped and supported by one hand of an operator, comparison elements within said casing, sighting means in an end wall of said casing and reflecting means in optical alignment therewith and so positioned that said comparison elements may be observed by an operator sighting through said sighting means, a bulb within said casing for projecting light upon said comparison elements, and a longitudinally disposed battery in said casing for energizing said bulb, the combination of terminal means adjacent the end wall of said casing remote from said sighting means for receiving current from an external source, means for operatively connecting said battery means and said terminal means with said bulb, said connecting means comprising a compactly related elongated set of conductors secured to said casing adjacent a side of said battery and having flexible arms extending from an end thereof to form a switch, and a movable member associated with said terminal means for actuating said switch for interrupting the flow of current from said battery to said bulb when an electrical attachment is brought into operative relationship with said movable member and before it is in operative engagement with said terminal means for supplying said bulb with current from said external source.

2. In a portable hemoglobinometer of the character described comprising an elongated casing of such limited size and transverse sectional shape that diametrically opposed exterior surfaces thereof may be conveniently gripped and supported by one hand of an operator and said casing having readily separable sections, sighting means in an end wall of one of said sections, reflecting means, a specimen holder and a standard comparison member arranged within one of said sections, said comparison member being slideable by the other hand of said operator relative to said holder for selectively positioning various portions thereof adjacent said holder during visual comparison therewith, a light bulb within another of said sections and adjacent said holder and comparison member for illuminating same, and a pair of batteries longitudinally arranged at opposite sides of said light bulb in said second section for energizing said bulb, the combination of terminal means carried adjacent the end wall of said second section remote from said sighting means and having a stationary part and a movable part for receiving electrical energy from an external source, means for connecting said batteries and said terminal means with said bulb, said connecting means comprising a nested set of conductors having a central supporting portion secured to said second section adjacent a side of one of said batteries and having flexible arms extending in opposite directions therefrom, said arms being arranged to form a manually operable switch for controlling the flow of current from said terminal means or said batteries to said bulb and arranged to form a second switch, said second switch being responsive to movement of said movable part to a first position for allowing a flow of current from said terminal means to said bulb and responsive to movement of said movable part to a second position for allowing a flow of current from said batteries to said bulb.

3. In a portable device of the character described comprising an elongated casing of such limited size and transverse sectional shape that diametrically opposed exterior surfaces thereof may be conveniently gripped and supported by one hand of an operator and said casing having readily separable sections, sighting means in an end wall of one of said sections, reflecting means, a specimen holder and a standard comparison member arranged within said one section, said comparison member being slidable relative to said holder by the other hand of said operator for selectively positioning various portions thereof adjacent said holder during visual comparison therewith, a light bulb within a second of said sections and adjacent said holder and comparison member for illuminating same, and a pair of batteries longitudinally arranged at opposite sides of said light bulb in said second section for energizing said bulb, the combination of terminal means carried adjacent the end wall of said second section remote from said sighting means and having a stationary part and a movable part for receiving electrical energy from an external source, means for releasably receiving and retaining said batteries in an operative position and for connecting said batteries and said terminal means to said bulb, said retaining and connecting means comprising a first conductor having a resilient arm engaging a terminal of one of said batteries and also comprising a nested set of conductors having a second resilient arm engaging a terminal of the other of said batteries, said nested set of conductors having a central relatively flat elongated supporting portion secured to said second section adjacent a side of one of said batteries, and also having a pair of flexible arms extending in one direction therefrom and a single flexible arm extending in the opposite direction therefrom, said single arm being arranged to form a manually operable switch for controlling the flow of current from said terminal means or said batteries to said bulb, said pair of flexible arms being arranged to form a second switch responsive to movement of said movable part to a first position for allowing a flow of current from said external source through said terminal means to said bulb and responsive to movement of said movable part to a second position for allowing a flow of current from said batteries to said bulb.

4. In a portable device of the character described comprising an elongated casing of such limited size and transverse sectional shape that diametrically opposed exterior surfaces thereof may be conveniently gripped and supported by one hand of an operator and said casing having readily separable sections, sighting means in an end wall of one of said sections, reflecting means, a specimen holder and a standard comparison member arranged within said one section, said comparison member being slideable relative to said holder by the other hand of said operator for selectively positioning various portions thereof adjacent said holder during visual comparison therewith, a light bulb within a second of said sections and adjacent said holder and comparison member for illuminating same, and a pair of batteries longitudinally arranged at opposite sides of said light bulb in said second section for energizing said bulb, the combination of terminal means carried adjacent the end wall of said second section remote from said sighting means and having a stationary part within said second section and a movable part for receiving electrical energy from an external source, said movable part being readily detachable from said device and having a cam surface, means for releasably receiving and retaining said batteries in an operative position and for connecting said batteries and said terminal means to said bulb, said retaining and connecting means comprising a first conductor having a resilient arm engaging a terminal of one of said batteries and also comprising a nested set of conductors having a second resilient arm engaging a terminal of the other of said batteries, said nested set of conductors having a central relatively flat elongated supporting portion secured to said second section adjacent one of said batteries, and also having a pair of flexible arms extending in one direction therefrom and a single flexible arm extending in the opposite direction therefrom, said single arm being arranged to form a manually operable switch for controlling the flow of current from said terminal means or said batteries to said bulb, said pair of flexible arms being arranged to form a second switch responsive to movement of said cam surface and movable part to a predetermined operative position within said second section for allowing a flow of current from said external source through said terminal means to said bulb, and responsive to movement of same away from said predetermined position for interrupting said flow from said external source and allowing a flow of current from said batteries to said bulb.

5. In a portable device of the character described comprising an elongated casing of such limited size and transverse sectional shape that diametrically opposed exterior surfaces thereof may be conveniently gripped and supported by one hand of an operator and said casing having readily separable sections, sighting means in an end wall of one of said sections, reflecting means, a specimen holder and a standard comparison member arranged within said one section, said comparison member being slideable relative to said holder by the other hand of said operator for selectively positioning various portions thereof adjacent said holder during visual comparison therewith, a light bulb within a second of said sections and adjacent said holder and comparison member for illuminating same, and a pair of batteries longitudinally arranged at opposite sides of said light bulb in said second section for energizing said bulb, the combination of terminal means carried adjacent the end wall of said second section remote from said sighting means and having a stationary part and a movable part for receiving electrical energy from an external source, means for releasably receiving and retaining said batteries in an operative position and for connecting said batteries and said terminal means to said bulb, said retaining and connecting means comprising a first conductor having a resilient arm engaging a terminal of one of said batteries and also comprising a nested set of conductors having a second resilient arm engaging a terminal of the other of said batteries, said nested set of conductors having a central relatively flat elongated supporting portion secured to said second section adjacent one of said batteries, and also having a pair of flexible arms extending in one direction therefrom and a single flexible arm extending in the opposite direction therefrom, said single arm being arranged to form a manually operable switch for controlling the flow of current from said terminal means or said batteries to said bulb, said pair of flexible arms being arranged to form a second switch responsive to movement of said movable part to a first position for allowing a flow of current from said external source through said terminal means to said bulb, and responsive to movement of said movable part to a second position for allowing a flow of current from said batteries to said bulb, and means on said device for retaining said movable part in an operative relation to said stationary part when moved to either of said positions.

6. In a portable device of the character described having an elongated casing, sighting means in an end wall of said casing, comparison elements in said casing, said casing being of such limited size and transverse sectional shape that diametrically opposed exterior surfaces thereof may be conveniently gripped and supported by one hand of an operator while his other hand is free for adjusting control means for said elements projecting outwardly through said casing, the combination of a light bulb within said casing, a pair of batteries longitudinally arranged at opposite sides of said light bulb for energizing said bulb, terminal means carried adjacent the opposite end wall of said casing and having a stationary part and a movable part for receiving electrical energy from an external source, means for releasably receiving and retaining said batteries in an operative position and for connecting said batteries and said terminal means to said bulb, said retaining and connecting means comprising a first conductor having a resilient arm engaging a terminal of one of said batteries and also comprising a nested set of conductors having a second resilient arm engaging a terminal of the other of said batteries, said nested set of conductors comprising a central relatively flat elongated supporting portion secured to said casing adjacent a side of a battery, and also having a pair of flexible arms extending in one direction therefrom and a single flexible arm extending in the opposite direction therefrom, said single arm forming a manually operable switch for controlling the flow of current from said terminal means or said batteries to said bulb, said pair of flexible arms being arranged to form a second switch automatically responsive to movement of said movable part toward a first position to disconnect said batteries from said manual switch and thereafter establish a connection between said external source and said manual switch, said pair of flexible arms also being effective upon movement of said movable terminal part to a second position for allowing a flow of current from said batteries to said switch.

HARRY F. LUNDBERG.

REFERENCES CITED

The following references are of record in the file of this patent:

UNITED STATES PATENTS

| Number | Name | Date |
|---|---|---|
| 1,764,148 | Buttolph | June 17, 1930 |
| 2,319,527 | Zavattaro | May 18, 1943 |
| 2,378,663 | Striker | June 19, 1945 |
| 2,396,260 | Gradisar et al. | Mar. 12, 1946 |